(No Model.)
W. A. HOLLAND.
SEED PLANTER.
No. 353,359. Patented Nov. 30, 1886.
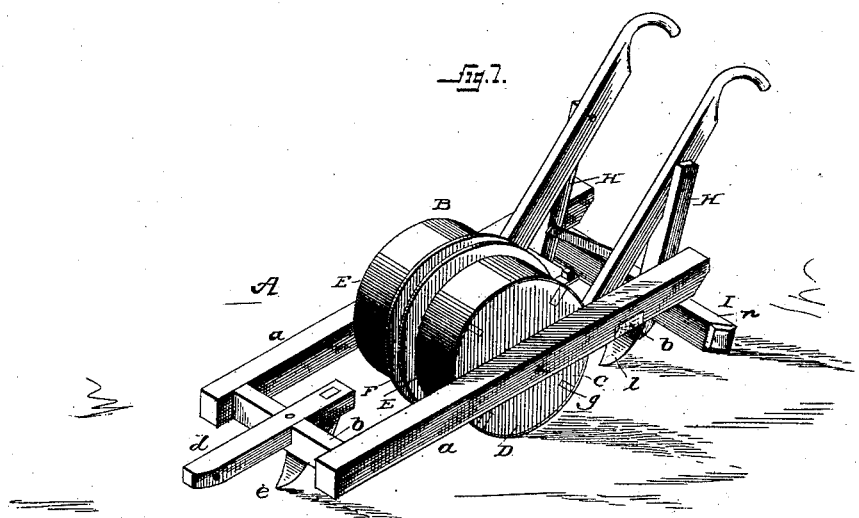
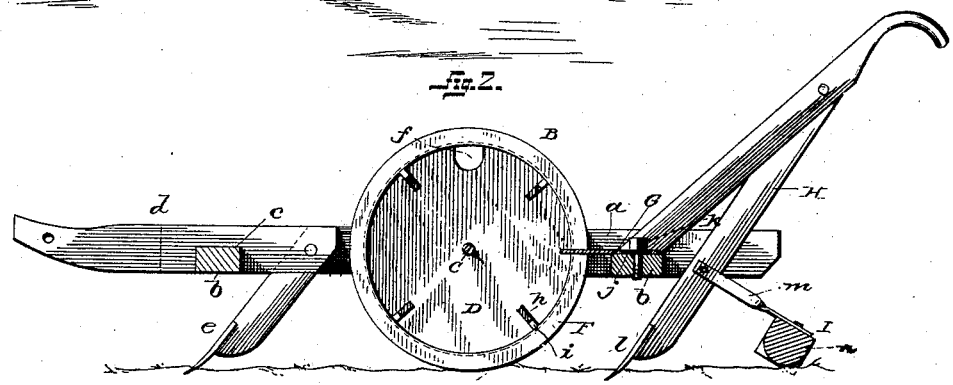
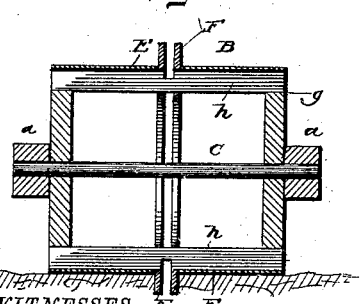
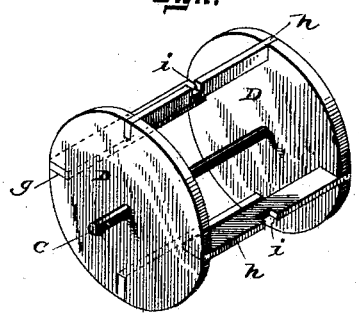

UNITED STATES PATENT OFFICE.

WILLIS ASA HOLLAND, OF LEWISVILLE, TEXAS.

SEED-PLANTER.

SPECIFICATION forming part of Letters Patent No. 353,359, dated November 30, 1886.

Application filed April 9, 1886. Serial No. 198,370. (No model.)

*To all whom it may concern:*

Be it known that I, WILLIS ASA HOLLAND, a citizen of the United States, residing at Lewisville, in the county of Denton and State of Texas, have invented certain new and useful Improvements in Seed-Planters; and I do hereby declare that the following is a full, clear, and exact description of the invention, which will enable others skilled in the art to which it appertains to make and use the same.

My invention relates to seed-planters, the object being to provide a planter which shall be simple in its construction, effective in its operation, and strong and durable, and one that will not be likely to get out of order.

With these ends in view the invention consists in the improved construction and combinations of parts, hereinafter fully described, and pointed out in the claim.

In the drawings, Figure 1 is a perspective view of a seed-planter embodying my invention. Fig. 2 is a longitudinal vertical section. Fig. 3 is a transverse section, and Fig. 4 is a detail view in perspective, of the skeleton frame of the hopper.

Corresponding parts in the several figures are denoted by the same letters of reference.

Referring to the drawings, A represents the supporting-frame, which comprises the sides $a$, connected near their front and rear ends by the cross or tie beams $b$. The front cross-beam $b$ is provided on its upper face with a mortise, $c$, in which is secured a draft-beam, $d$, and secured to and depending from said draft-beam is a furrow-opener or plow, $e$.

B represents the hopper, which is mounted on a shaft, C, having its ends journaled in the sides of the supporting-frame A. The hopper B is composed of the circular heads D, one of which may be provided with an opening, $f$, for the introduction of seed to the hopper. The heads D are provided at suitable intervals on their peripheries with mortises or recesses $g$, in which are fitted cross-bars $h$, connecting the heads of the hopper, said cross-bars being provided with recesses $i$ about midway their ends.

E represents circular strips of metal, which inclose or encircle the cross-bars $h$, their inner ends being located a slight distance from the recesses $i$, while their outer ends fit upon and are secured to the heads of the hopper.

F represents rings or circular flanges, which fit upon the cross-bars $h$, between the recesses $i$ therein and the inner ends of the circular strips E, said rings or flanges being so arranged as to leave a slight space between them.

Upon the rear cross-beam $b$ is secured a tapering metallic plate, G, which has an elongated slot, $j$, through which a set-screw, $k$, passes, said set-screw entering a threaded opening in the beam $b$, whereby the plate may be moved to or from the hopper. The inner end of the tapering plate fits between the rings or flanges F, so that as the hopper revolves the seed will be carried with it, and when the end of the metallic plate is encountered it will cause the seed to be dropped in suitable quantities H represents plow-standards, secured to the inner sides of the side beams of the supporting-frame near the rear end thereof, said beams having plows or shovels $l$ secured to their lower ends, which are adapted to throw the dirt in toward the seed which has been dropped by the hopper. These standards are braced at their upper ends by handles secured thereto, and secured at their lower ends to the side beams of the frame.

I represents a coverer, pivoted at the rear end of the supporting-frame and comprising the metallic plates $m$, carrying the strip or beam $n$, recessed or hollowed out on its inner side.

A cotton-seed planter constructed as before described is cheap, simple, and durable, its operation is thoroughly effective, and it is not liable to get out of order.

Having thus fully described my invention, what I claim as new, and desire to secure by Letters Patent, is—

In a cotton-seed planter, the combination, with a supporting-frame, of a revolving hopper comprising circular heads connected by cross-bars having recesses, circular strips inclosing the cross-bars and leaving a space between their inner ends, flanges secured between and projecting through the circular strips and leaving a space between them, a slotted plate located on one of the bars of the frame and having its end located between the flanges, and a set-screw for clamping the plate in place, substantially as set forth.

In testimony whereof I affix my signature in presence of two witnesses.

WILLIS ASA HOLLAND.

Witnesses:
D. L. WILKINS,
W. T. HYDES.